Figure 1:
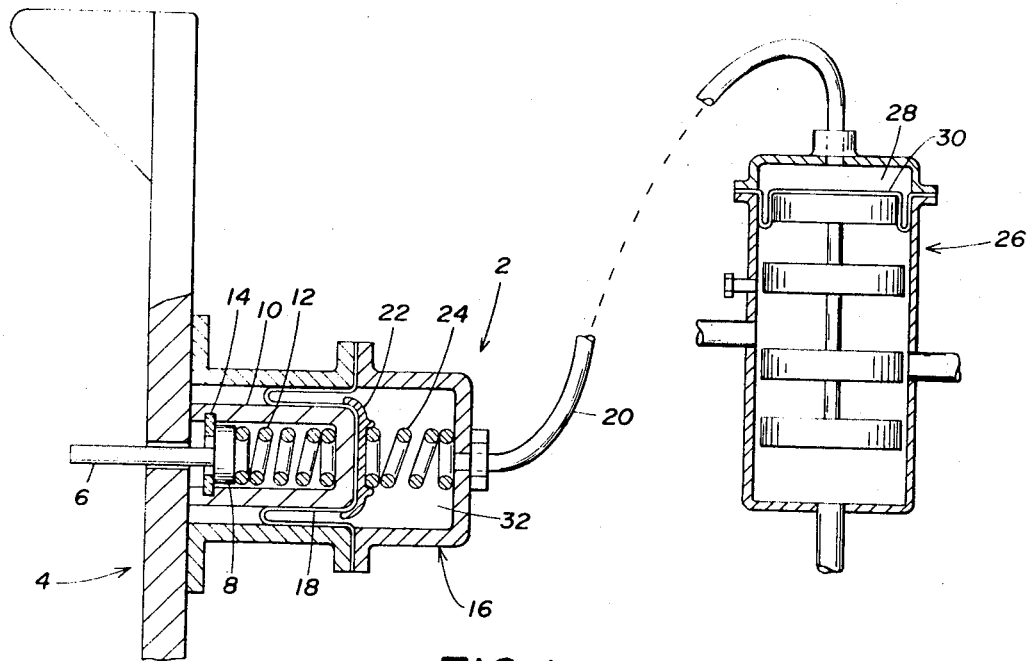

United States Patent [19]

Cope

[11] 3,743,110
[45] July 3, 1973

[54] COUPLING VALVE ACTUATOR FOR AUTOMATIC PNEUMATIC COUPLING SYSTEM

[75] Inventor: Geoffrey Wilton Cope, Williamsville, N.Y.

[73] Assignee: Dresser Industries, Inc., Dallas, Tex.

[22] Filed: July 14, 1971

[21] Appl. No.: 162,377

[52] U.S. Cl. ................................................ 213/76
[51] Int. Cl. ............................................. B61g 5/08
[58] Field of Search ....................... 213/76; 285/58; 339/48

[56] References Cited
UNITED STATES PATENTS
3,556,314  1/1971  Punwani .............................. 213/76
3,591,017  7/1971  Cope et al. ........................... 213/76

Primary Examiner—Drayton E. Hoffman
Attorney—Robert W. Mayer et al.

[57] ABSTRACT

A coupling valve actuating mechanism for operating a pilot or interface valve in an automatic coupling system wherein the force required to open the valve upon the depression of a spring-projected plunger in a coupling operation is transmitted by either a hydraulic fluid or a flexible push-pull-type cable.

6 Claims, 2 Drawing Figures

PATENTED JUL 3 1973

3,743,110

INVENTOR:
GEOFFREY W. COPE

Raymond J Mijerko
ATTORNEYS

COUPLING VALVE ACTUATOR FOR AUTOMATIC PNEUMATIC COUPLING SYSTEM

For use with any type of mechanical coupler, the coupling valve actuating means suitably is of the spring-pressed or returned, plunger-type and mounted in the head of the mechanical coupler or the separate train line connector, depending on the form of the mechanical coupler, with its plunger normally spring-projected.

A coupling valve actuator of prior art is referred to as a "puffer" or "one-way valve" capable itself of developing or producing a charge of compressed air on actuation or depression of the plunger against the force of the latter's return spring. This charge is developed by a piston on the rear end of the plunger and is suitably sealed to the valve body by a rolling diaphragm in a pressure chamber in the body rearward of the head. The puffer has as its only port an outlet port leading from the pressure chamber or casing.

The puffer, since it develops its own charge, is not dependent for supply on the brake line pressure; however, the pressure charge it is capable of developing is low relative to the brake line pressure and is usually around 5 p.s.i. Thus, the puffer is not readily adapted to actuate the control valve in an automatic pneumatic coupling system. Instead, it ordinarily must act as a primary pilot valve for actuating or operating a secondary pilot or fluidic interface valve, sensitive in actuation to the puffer's low pressure.

The pneumatic puffer described above is disclosed in U.S. Pat. No. 3,556,314, assigned to the assignee of the present invention, as is an automatic pneumatic coupling system and is incorporated herein by reference. As the operating pressure for this puffer was the pressure differential built up by the travel of the plunger, providing there was no leakage of air, the puffer would operate the fluidic interface or pilot valve satisfactorily. However, after extended testing, it was found that loss of air did occur in the system, and it was very difficult to maintain sufficient pressure over a sustained compression period or after a large number of short periods of compression. This was mainly due to the fact that there was no satisfactory way to provide a reservoir to make up for air leakage.

Accordingly, it is an object of the present invention to provide a coupling valve actuating mechanism in which the pressure to the pilot valve in an automatic coupling system may be regulated.

It is another object of the invention to provide a coupler valve mechanism which utilizes a noncompressible medium for actuation of an automatic pneumatic coupling system.

Still another object of the invention is to provide a coupling valve mechanism which contains a reservoir means for the pilot valve actuating medium which permits considerable leakage in the system before the unit becomes ineffective.

Figure 2:
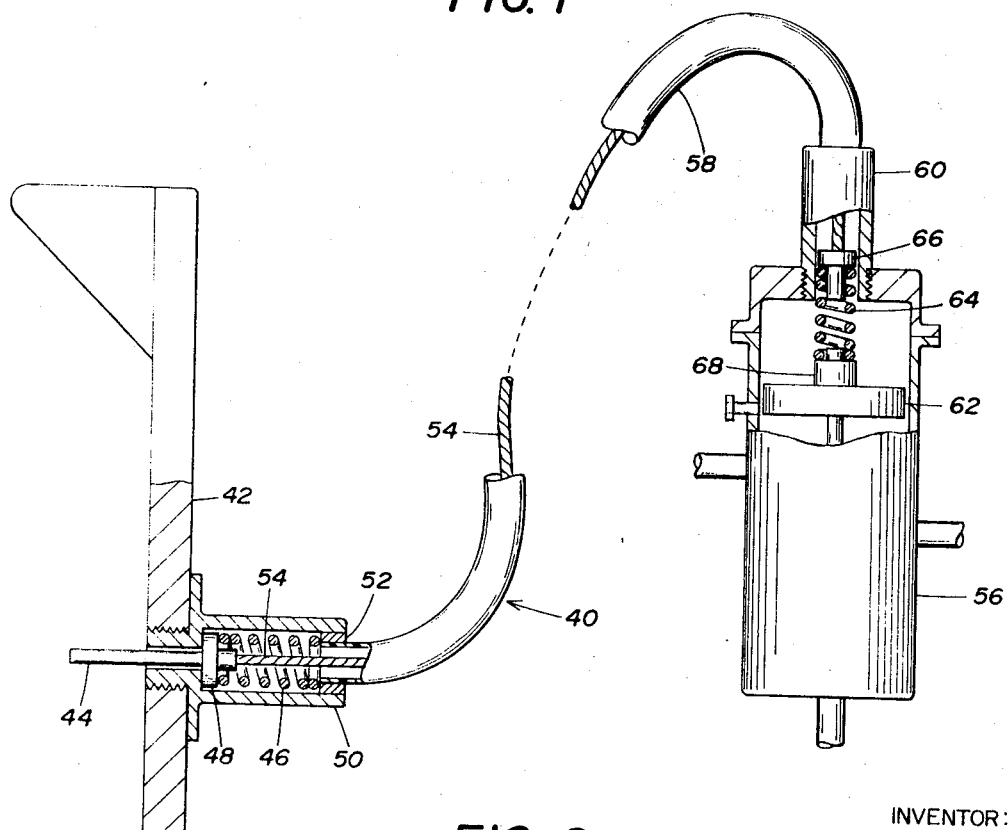

Other objects of the invention will become apparent in view of the following detailed description and drawings, in which:

FIG. 1 is a schematic view of the preferred embodiment of the coupler valve actuating mechanism of the present invention; and FIG. 2 is a schematic view of an alternate embodiment of the coupler valve actuating mechanism.

In accordance with the present invention, there is provided a coupling valve actuating mechanism suitable for operative connection to a pilot or interface valve in an automatic coupling system. The mechanism includes an outer casing, a spring-projected plunger extending from one end of the casing, a flexible conduit extending from the other end of the casing and communicating with the pilot valve and a nongaseous, nonyielding means disposed in the casing and flexible conduit for opening the pilot valve when the plunger is depressed in a coupling operation.

Referring now to FIG. 1, there is shown a preferred coupling valve actuating mechanism. The mechanism 2 is shown as being mounted in the head 4 of a train line connector with its plunger 6 normally projected for engagement with the mating coupler or member without risk of damage to itself or its connection to the balance of the valve mechanism from service shocks on the mechanical coupler (not shown). The plunger 6 terminates at its inner end in a piston head 8 which is disposed and retained within a cylindrical member 10. The plunger is normally projected by a precompressed spring 12 which is arranged between the piston head and the closed end of the cylindrical member and retained by an internal snap ring 14.

The cylindrical member 10 containing the plunger piston 6 is arranged within a larger outer metal casing 16 which is shown to be fabricated in two sections. The cylindrical member 10 forms a piston head to cooperate with a rolling diaphragm 18 which envelops a portion of the member and fills a portion of the interior of the casing and forms a seal between two parts of the outer casing 16 which are joined by bolting or other suitable means.

A retainer plate serves to hold the rolling diaphragm in contact with the cylindrical member 10 and also forms a seat for the spring 24 which serves to return the plunger 6 and cylindrical member 10 assembly to the extended position.

The flexible hose 20 communicates with a pilot or interface valve 26 in an automatic pneumatic coupling system through a hydraulic fluid reservoir 28 which bears against a diaphragm 30 in the pilot valve 26. The cavity 32 formed by the rolling diaphragm and the center casing, flexible hose 20 and reservoir 28 are filled with a hydraulic fluid, such as oil. Thus, the mechanism utilizes the hydraulic fluid as a transmission medium only, and the pressure is regulated by the precompressed spring 12 contained in the cylindrical member and urging the plunger 6 to the extended position. The pressure can be increased by increasing the plunger spring force and decreased by reducing the spring force. Since the hydraulic fluid is not compressible at the pressures encountered in a coupling operation, the travel of the plunger is not used up in building up the pressure but is stored in the spring 12 which initially is preloaded to the required force. Therefore, the spring compression from the plunger travel is, in effect, a reservoir of hydraulic fluid, and considerable leakage could occur before the unit becomes ineffective.

As the plunger is depressed in a coupling operation, the diaphragm 18 contracts, exerting force against the hydraulic fluid, and the force is applied against the diaphragm 30 of the pilot valve 26 through the pilot valve fluid reservoir 28. The pilot valve diaphram moves the valve spool 34 to a position which opens the valve and permits passage of air therethrough in the automatic coupling system to open the main control valve and ultimately allow the passage of air through the main air train line valve which allows the maintenance of pressure and continuity of the train line between adjacent coupled railway cars.

Referring to FIG. 2 of the drawings, an alternate embodiment is shown. Here, the coupling valve mechanism 40 is also removably attached to the connector head. Here also, the plunger 44 is normally projected by a spring 46 which bears against the piston head 48 of the plunger 44 contained within the outer casing 50 and the closure 52. To the end of the piston head 48 is attached a flexible push-pull cable 54 which communicates with the pilot or interface valve 56 through a flexible conduit 58. The cable enters the valve body through an upper orifice 60 and is normally spaced from the pilot valve spool 62 by a spring 64. Thus, when the plunger 44 is depressed in a coupling operation, the cable 54 mechanically operates the pilot valve forcing it and the valve spool downwardly to open the valve as shown in FIG. 2. This embodiment also utilizes the spring means 64 between the cable end 66 and the pilot valve 68 so that the spool may be moved to the uncoupled position while the plunger is depressed, before the connector heads are separated and the plungers 44 released.

While the invention has been described with regard to certain preferred embodiments, it should be understood that modifications, substitutions and the like may be made therein without departing from the scope of the invention.

Having thus described the invention in detail and with sufficient particularity as to enable those skilled in the art to practice it, what is desired to have protected by Letters Patent is set forth in the following claims.

The embodiments of the invention in which an exclusive property or privilege is claimed are defined as follows:

1. A coupling valve actuating mechanism suitable for operative connection to a pilot valve in an automatic coupling system, said actuating mechanism comprising an outer casing, a spring-projected plunger extending from one end of the casing, a flexible conduit extending from the other end of the casing and communicating with the pilot valve and a flexible cable disposed in the casing and flexible conduit for opening the pilot valve when the plunger is depressed in a coupling operation.

2. The mechanism of claim 1 in which one end of the flexible cable contacts an end of the plunger disposed within the casing and the other end engages a spring means within the pilot valve which operates against a rod for opening said valve.

3. A coupling valve actuating mechanism suitable for operative connection to a pilot valve in an automatic coupling system, said actuating mechanism comprising an outer casing, a plunger extending from one end of the casing, a flexible conduit extending from the other end of the casing and communicating with the pilot valve and a nongaseous means disposed in the casing and flexible conduit for opening the pilot valve when the plunger is depressed in a coupling operation, the plunger extending from the end of the casing having a piston head retained within a cylindrical member closed at one end, there being a spring means disposed between the piston head and the closed end of the cylinder for projecting the plunger and resilient means disposed between the closed end of the cylindrical member and the end of the casing from which the flexible conduit extends for projecting the cylindrical member.

4. The mechanism of claim 3 in which the nongaseous, nonyielding means is hydraulic fluid.

5. The mechanism of claim 3 in which the resilient means is a diaphragm which envelops a portion of the cylindrical member and contains therewithin (1) a spring means disposed between the end of the cylindrical member and the end of the casing and (2) hydraulic fluid.

6. The mechanism of claim 3 in which an end of the flexible conduit communicates with a diaphragm means in the pilot valve.

* * * * *